UNITED STATES PATENT OFFICE.

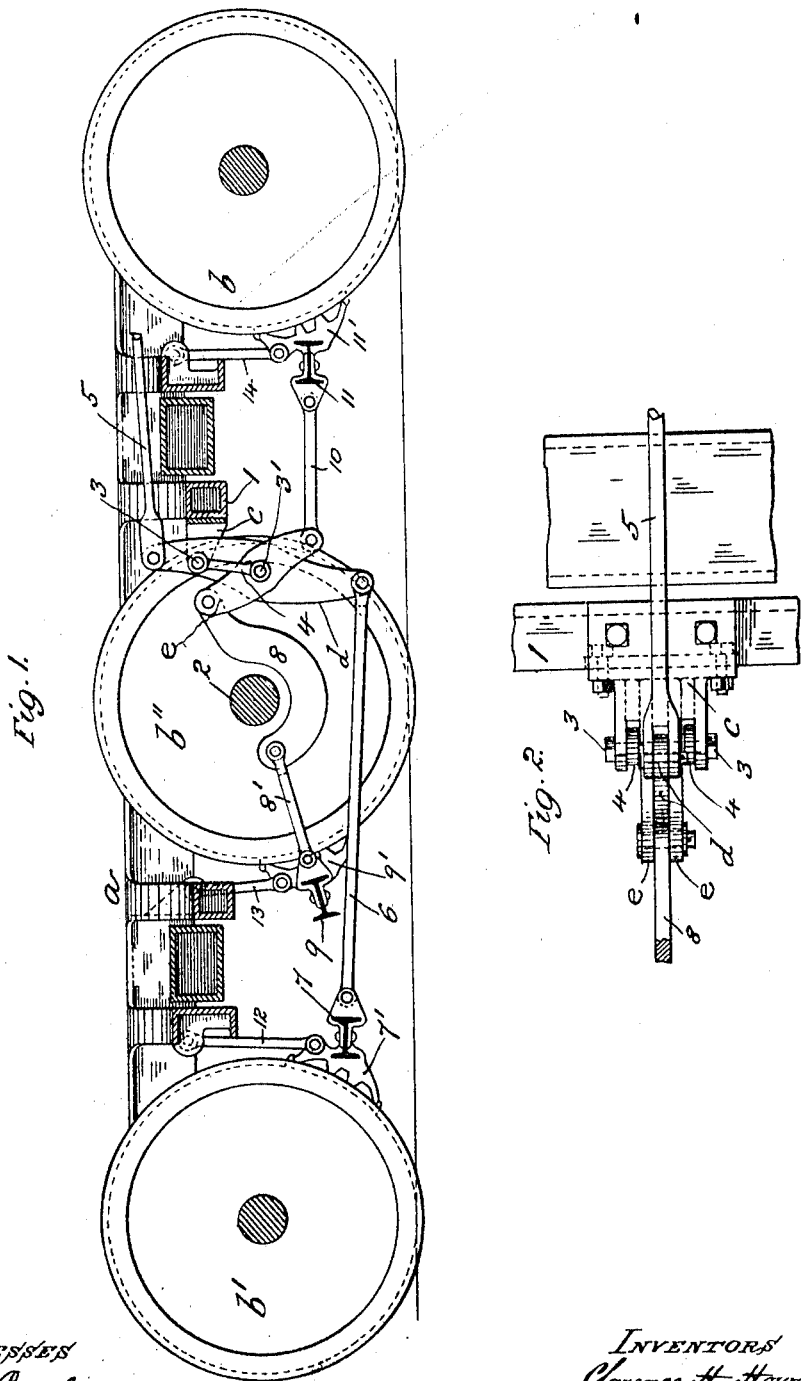

CLARENCE H. HOWARD AND HARRY M. PFLAGER, OF ST. LOUIS, MISSOURI, ASSIGNORS TO DOUBLE BODY BOLSTER COMPANY, OF ST. LOUIS, MISSOURI, A CORPORATION OF NEW JERSEY.

CAR-BRAKE GEAR.

991,850.    Specification of Letters Patent.    Patented May 9, 1911.

Application filed November 3, 1910. Serial No. 590,485.

*To all whom it may concern:*

Be it known that we, CLARENCE H. HOWARD and HARRY M. PFLAGER, citizens of the United States, residing at St. Louis, in the State of Missouri, have invented a new and useful Improvement in Car-Brake Gear, of which the following is a specification.

Our invention relates particularly to the operating parts of the brake-gear carried by a six-wheeled car truck, and has for its object to simplify the arrangement and reduce the number of the said parts, whereby the transverse end members of the truck frame are eliminated and the truck thereby lightened and rendered more compact.

The invention consists in features of novelty as hereinafter described and claimed, reference being had to the accompanying drawing forming part of this specification, whereon, Figure 1, is a central vertical longitudinal section through so much of a six-wheeled car truck as is necessary for illustrating our invention, with the operating parts of the brake-gear carried thereby in side elevation, and Fig. 2, a top plan view to enlarged scale of some of the said parts detached and their attachment to a transom of the truck frame.

Like letters and numerals of reference denote like parts in both figures.

$a$ represents the frame, and $b$, $b'$, $b''$, the inner, outer, and middle wheels respectively, of a six-wheeled car truck. To one of the transverse members or transoms 1 of the frame adjacent to the middle wheels $b''$ is preferably fixed a bracket $c$ which projects outward therefrom, or toward the axle 2 of the wheels $b''$, and to the bracket $c$ (one on each side thereof) are pivoted or fulcrumed by a pin 3, the upper ends of preferably, two parallel and depending links 4 which are of equal length and connected to each other at their lower ends by a pin $3'$ on which, between the links 4, are pivotally mounted in their middle or thereabout, and side by side, the main pull-lever $d$ and the equalizing lever $e$ the latter being made preferably in duplicate parts, one on each side of the main pull-lever $d$. The levers $d$ and $e$ are at a suitable inclination to each other with the upper and lower ends of the equalizing lever $e$ inclined outwardly and inwardly respectively, relatively to the axle 2 of the wheels $b''$, from the main pull-lever $d$.

To the upper end of the main pull-lever $d$ is coupled one end of the main pull-rod 5 which connects at its other end in the usual manner with the air brake-cylinder mechanism (not shown); while to the lower end, or thereabout, of the main pull-lever $d$ is coupled the inner end of the rod 6 which connects at its other end with the brake-beam 7 carrying the brake-shoes $7'$ for engagement with the outer wheels $b'$ on the inside of their treads as shown. To the upper (outward) end of the equalizing lever $e$ is coupled one end of a bar (or rod) 8 which in the present case is adapted to pass under the axle 2 of the middle wheels $b''$ and coupled at its other end to an extension rod $8'$ (forming practically part of the bar 8) which connects at its other end with the brake-beam 9 carrying the brake-shoes $9'$ for engaging the middle wheels $b''$ on the outer side of their treads; while to the lower (inward) end of the equalizing lever $e$ is coupled one end of the rod 10 which connects at its other end with the brake-beam 11 carrying the brake-shoes $11'$ for engaging the inner wheels $b$ on the inside of their treads, the brake-shoes $7'$, $9'$, and $11'$, being supported by the suspension links 12, 13, and 14, in the usual manner from the frame $a$ as shown.

In operation, assuming the brake-shoes $7'$, $9'$, $11'$, to be in their normal position, or out of contact with the respective wheels of the truck, in applying the brakes from the air brake-cylinder in the usual manner and thereby pulling on the main pull-rod 5, the main pull-lever $d$ will be moved about its fulcrum $3'$ so that its lower end pushes the rod 6 and brake-beam 7 and thereby applies the brake-shoes $7'$ to the outer wheels $b'$ on the inside of their treads. Simultaneously, the equalizing lever $e$ will be moved about the fulcrum $3'$ and combined with its swinging movement about the fulcrum 3 of the suspension links 4 will cause the upper end of the equalizing lever $e$ to pull on the bar 8 with its extension $8'$, and the brake-beam 9, and thereby apply the brake-shoes $9'$ to the middle wheels $b''$, and furthermore, cause the lower end of the lever $e$ to push the rod 10 and brake-beam 11, and thereby apply the brake-shoes $11'$ to the inner wheels $b$.

By the above construction, the main pull-lever $d$ and the equalizing lever $e$, in lieu of being separately located at different parts of the truck as in the ordinary arrangement of the brake-gear, are aggregated and pivoted on a common fulcrum, thereby eliminating their connecting rod and suspension links; and by locating the brake-shoes $7'$ and $11'$ on the inside, in lieu of the outside, of the outer and inner wheels $b'$, and $b$, the usual end members of the truck frame are dispensed with and the truck thereby reduced in length and weight.

What we claim as our invention and desire to secure by Letters Patent is:—

1. In car brake-gear of the character described, a main pull-lever, and an equalizing lever having a swinging common fulcrum.

2. In car brake-gear of the character described, a main pull-lever, and an equalizing lever having a common fulcrum, the said levers being suspended from the car truck so as to swing vertically relative thereto.

3. In car brake-gear of the character described, a main pull-lever, and an equalizing lever having a common fulcrum, the said levers being suspended from, and movable radially about a fixed point on the car truck.

4. In car brake-gear of the character described, a main pull-lever, and an equalizing lever having a swinging common fulcrum, and means in connection with the said levers for applying the brake-shoes of the said gear to the wheels of the truck.

5. In car brake-gear of the character described, a main pull-lever, and an equalizing lever having a swinging common fulcrum, a main pull-rod, and means for applying the brake-shoes of the said gear to the wheels of the truck.

6. In car brake-gear of the character described, a main pull-lever, an equalizing lever adapted to be moved by the main pull-lever which equalizing lever and pull lever have a swinging common fulcrum and means in connection with the said levers for applying the brake-shoes of the said gear to the inner and outer wheels of the truck on the inside of their treads.

7. In car brake-gear of the character described, a main pull-lever, an equalizing lever adapted to be moved by the main pull-lever, which equalizing-lever and pull lever have a swinging common fulcrum, a main pull-rod, and means in connection with the said levers for applying the brake-shoes of the said gear to the inner and outer wheels of the truck on the inside of their treads.

8. In a car brake-gear of the class described a pivot pin swung from the truck frame, and a main pull lever and an equalizing lever mounted on said swinging pivot pin.

9. In a car brake-gear, a link suspended from the truck frame and arranged to swing relative thereto, and a main pull lever and an equalizing lever pivotally mounted upon said link and having a common fulcrum thereon.

CLARENCE H. HOWARD.
HARRY M. PFLAGER.

Witnesses:
HAL C. BELLVILLE,
EDWARD W. FURRELL.